(12) United States Patent
Knapp et al.

(10) Patent No.: US 7,719,825 B1
(45) Date of Patent: *May 18, 2010

(54) FACEPLATE INCLUDING WIRELESS LAN COMMUNICATIONS

(75) Inventors: Joseph Knapp, San Mateo, CA (US); George Chien, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 7 days.

This patent is subject to a terminal disclaimer.

(21) Appl. No.: 12/229,933

(22) Filed: Aug. 28, 2008

Related U.S. Application Data

(63) Continuation of application No. 10/336,364, filed on Jan. 2, 2003, now Pat. No. 7,420,800.

(51) Int. Cl.
*G06F 1/16* (2006.01)
(52) U.S. Cl. .............................. 361/679.02; 312/223.2; 712/241; 375/241; 705/45
(58) Field of Classification Search .............. 312/223.2; 712/237, 241; 375/219, 241; 705/39, 40, 705/45; 361/679.18, 679.23, 679.31, 679.32, 361/679.3, 679.4, 679.56
See application file for complete search history.

(56) References Cited

U.S. PATENT DOCUMENTS

| | | | |
|---|---|---|---|
| D439,582 S | 3/2001 | Jensen et al. | D14/445 |
| 6,788,543 B2 * | 9/2004 | Yanagida | 361/727 |
| 6,880,020 B1 | 4/2005 | Rubinstein et al. | 709/250 |
| 6,919,678 B2 | 7/2005 | Ozolins et al. | 313/479 |
| 7,420,800 B1 * | 9/2008 | Knapp et al. | 361/679.55 |
| 2003/0198010 A1 | 10/2003 | Homer et al. | 361/683 |
| 2005/0040744 A1 | 2/2005 | Chen et al. | 312/265.6 |
| 2006/0226743 A1 * | 10/2006 | Chen | 312/223.2 |

OTHER PUBLICATIONS

USPTO Non-Final Office Action mailed Oct. 3, 2007 for U.S. Appl. No. 10/336,364, filed Jan. 2, 2003.
Amendment filed Jan. 2, 2008 in response to USPTO Non-Final Office Action mailed Oct. 3, 2007 for U.S. Appl. No. 10/336,364, filed Jan. 2, 2003.

* cited by examiner

*Primary Examiner*—Hung V Duong

(57) ABSTRACT

A faceplate for a housing of a computing device including a processor includes a bezel with interior and exterior surfaces. The bezel removeably covers at least a portion of an opening defined by the housing. A wireless local area network (LAN) unit is mechanically coupled to the interior surface of the bezel and comprises a data interface that enables data transfer between the wireless LAN unit and the processor.

22 Claims, 5 Drawing Sheets

FACEPLATE INCLUDING WIRELESS LAN COMMUNICATIONS

CROSS REFERENCE TO RELATED APPLICATIONS

This application is a continuation of U.S. patent application Ser. No. 10/336,364, filed Jan. 2, 2003. The disclosure of the above application is incorporated herein by reference in its entirety.

TECHNICAL FIELD

This invention is related to wireless LAN communications, and is particularly concerned with techniques for providing wireless LAN functionality to desktop computers.

BACKGROUND OF THE INVENTION

The past few years has witnessed the ever-increasing availability of relatively inexpensive, low power wireless data communication services, networks and devices, promising near wire speed transmission and reliability. One technology in particular, described in the IEEE Standard 802.11b-1999 Supplement to the ANSI/IEEE Standard 802.11, 1999 edition, collectively incorporated herein fully by reference, and more commonly referred to as "802.11b" or "WiFi", has become the darling of the information technology industry and computer enthusiasts alike as a wired LAN/WAN alternative (because of its potential 11 Mbps effective data transmission rate, ease of installation and use, and transceiver component costs make it a real and convenient alternative to wired 10 BaseT Ethernet and other cabled data networking alternatives. With 802.11b, workgroup-sized wireless LAN networks can now be deployed in a building in minutes, a campus in days instead of weeks since the demanding task of pulling cable and wiring existing structures is eliminated. Moreover, 802.11b compliant wireless networking equipment is backwards compatible with the earlier 802.11 1 M/2 Mbps standard, thereby further reducing deployment costs in legacy wireless systems.

More recently, even faster effective data throughput has been achieved with deployment of next generation wireless LAN communications devices, including access points and client adaptors, compliant with IEEE Standard 802.11a (1999) and DRAFT IEEE Standard 802.11g (2002) High Rate PHY Supplements to the ANSI/IEEE Standard 802.11, 1999 edition, also collectively incorporated herein fully by reference.

To date, wireless LAN client adaptors for the 802.11 family (including adaptors compliant with the base 802.11, 802.11b, 802.11a and 802.11g standards), which provide wireless LAN communications functionality to an individual computer, have been packaged in one of five general ways. FIG. 1 shows a wireless LAN client adapter 101 packaged in a removable PC Card or PCMCIA form factor. When fully inserted (interface 103 first) into a peripheral slot such as a PC Card or PCMCIA slot on a compatible host computer, such as a laptop, network appliance, or PDA, the antenna portion 102 is designed to extend from the end of the slot and beyond the computer case perimeter. This configuration enhances adaptor RF performance, and ultimately effective bandwidth and communications link quality since the antenna 102 is placed outside the RF damping effects of a typically metallic card receiver within the computer (not shown), computer chassis (not shown), and RF shielding used to attenuate RF radiation created by internal computer components such as the information processing system (e.g. a CPU or microprocessor). In other words, the external positioning of antenna 102 avoids the Faraday cage effects of the computer card receiver and/or chassis, as well as reduce component-generated RF interference since the RF shielding, being contained within the computer case, is inherently positioned between the antenna 102 and the RF radiating components. Following pressures to make electronic devices smaller and more power efficient, wireless LAN client adaptors have been recently introduced which generally follow the configuration shown in FIG. 1 but have smaller overall form factor, such as those specified for removable insertion into Compact Flash (aka CF-Card), Smartmedia, Secure Digital (SD) or MultiMedia Card (MMC) compatible peripheral slots being introduced on the newest computers and intelligent devices.

Due to the popularity of the PC Card package shown in FIG. 1, as well as competitive pressures to re-use designs where practicable, another configuration alternative is presented in FIG. 2 which is suitable for deployment in desktop computers. This configuration includes the PC card wireless LAN adaptor 101 mated to a PCI daughtercard 201 for removable insertion into a PCI slot (not shown) found on most desktop system boards or motherboards. In particular, the card edge interface 202 and the PCI glue logic 204 is used to bridge communications between the PCI bus of a desktop computer hosting the adaptor and the PC Card interface 103 fitted to card receiver 206. The metal card guide 208 is used to secure the daughtercard 201 including the wireless LAN adaptor 101 firmly into the PCI slot and within the desktop computer housing (not shown). As in FIG. 1, the antenna 102 is designed to be positioned external to the daughtercard 201 and the computer case when the adaptor 101 is fully inserted into the receiver 103 to maximize potential RF performance.

With respect to the wireless LAN adaptor configurations shown in FIGS. 1 and 2, the following apparent shortcomings are noted. First, in both configurations, the antenna 102 is in a fixed position external to the computer and case into which the adaptor is inserted. This limits antenna positioning options, as the whole host computer, not the antenna must be reoriented. This is particularly disadvantageous when the host computer adopts a desktop form factor, including a minitower or full tower chassis, which, because of its bulk, lends itself to placement on a floor underneath a desk, table or other work surface and often in a corner. This, in turn, positions the typically rear-facing antenna in a far from ideal RF reception environment. Moreover, since the antenna 102 extends from the protective computer case, it is subject to impact damage and stress, and actually alters the form factor of the computer hosting the adaptor, making it harder to carry or fit within tight spaces. Finally, such packaging unnecessarily adds costs, particularly with respect to the configuration shown in FIG. 2, since two distinct types of interfaces must be supported, along with artificially imposed constraints on the wireless adaptor 102 form factor.

Responsive to these shortcomings, a third wireless LAN adaptor alternative has been introduced and is generally depicted in FIG. 3. In this configuration, the entire wireless LAN adaptor 302 is packaged as a self-contained unit external to the computer (not shown) it is servicing. A universal serial bus connection via plug 306 is used to enable high speed communication between the adaptor 302 and the computer. This configuration permits easy repositioning or reorientation of a movable antenna 304, as well as the adaptor 302 itself, and does not detract from the host computer's form factor or portability, the latter assuming the adaptor 302 is unplugged prior to transport. Further, this adaptor 302 can easily interface with and support any computer supporting USB, including USB 1.1, USB 2.0, and USB On-The-Go.

However, the standalone configuration shown in FIG. 3 requires a robust and protective housing 305, which adds cost, and takes up additional space, and actually becomes a separate article to manage for the clutter conscious. Further, due to the strict power draw requirements present in these USB standards, this configuration may need to draw power from an external power supply to maintain acceptable operating range, thereby further adding to clutter and installation inconvenience over other known adaptor configurations.

FIG. 11 illustrates a fourth known wireless LAN adaptor configuration 1100. This configuration is generally similar to the configuration 200 shown in FIG. 2 and is also particularly suited for use in desktop computer systems. As such, PCI glue logic 204 is used to bridge communications between the host computer and the wireless LAN adaptor components, but in this case, the PC Card interface 103 is eliminated and the baseband processor 1112 and RF transceiver unit ICs 1110 comprising the wireless LAN adapter unit electronics are disposed directed on the daughtercard 1120. Like the configuration shown in FIG. 2, the baseband processor and transceiver electronics remain protected by the computer housing when the daughtercard 1120 is secured therein.

However, in this alternative, an external antenna unit 102 is physically removed from the daughtercard but remains RF coupled thereto through a coaxial cable 1104 removably secured to a cable interface 1114 shown here extending through the guide 208. In so doing, the antenna unit 1102 can be repositioned or reoriented to improve wireless link quality, yet the transceiver components remain protected and shield by the enveloping computer casing and chassis, unlike the configuration alternative shown in FIG. 3.

In view of the external antenna unit 1102 and cabling unit 1104, this solution, like the configuration shown in FIG. 3, adds to clutter and installation inconvenience. Moreover, this configuration is not believed practical in cost sensitive applications, since, at the very least, a relatively expensive external antenna unit 1102, a durable coaxial cabling 1104 and a cable interface 1114 must now be additionally included as part of the adaptor parts, and consequently presents increased manufacturing and assembly complexity.

Finally, some of the latest computer designs offer integrated wireless LAN capabilities, typically through coupling transceiver and baseband processor electronics on the computer motherboard or on a proprietary or mini-PCI daughtercard with an antenna disposed on or integrated within the computer case. Like FIG. 11, a coaxial cable is used to RF couple the RF transceiver electronics to the antenna. While performance is generally superior, this type of configuration is typically customized to the particular computer in which it is designed to operate and is thus limited to those buying such computers. Upgrade options are limited. Moreover, these solutions are relatively costly compared with more traditional configurations highlighted above.

SUMMARY OF THE INVENTION

In accordance with the above noted shortcomings and disadvantages, the present invention is directed in part to a external bay faceplate for a computer case which includes an integrated wireless LAN unit. In particular, in accordance with one aspect of the invention, a faceplate is provided which includes a bezel defining interior and exterior major surfaces arranged to removably cover at least a portion of an external bay opening in a computer case, and a wireless LAN unit mechanically coupled to the interior major surface of said bezel and including a data interface to enable data transfer between the wireless LAN unit and the information processor housed within the computer case.

In accordance with one or more disclosed embodiments, several protocols and wired interfacing techniques, including various flavors of USB, FireWire, ethernet, and disk or removable media drive transmission may be used to convey data between the information processor of the host computer and the wireless LAN unit. Cabling may be routed directly from the motherboard supporting the information processor to the wireless LAN unit, or from a daughtercard communicating with the information processor.

One or more of the disclosed embodiments feature a blank faceplate covering substantially all of the external bay opening. Alternatively, wireless LAN unit may form part of a drive faceplate, such as a removable media faceplate. Accordingly the invention is believed to have wide application and appeal in a variety of host computer configurations and form factors, and provides a cost-efficient way to provide a host computer with wireless communications.

Additional aspects and advantages of this invention will be apparent from the following detailed description of embodiments thereof, which proceeds with reference to the accompanying drawings, in which like reference numerals indicate like parts.

BRIEF. DESCRIPTION OF THE DRAWINGS

DETAILED DESCRIPTION OF EMBODIMENTS OF THE INVENTION

Figure 1:
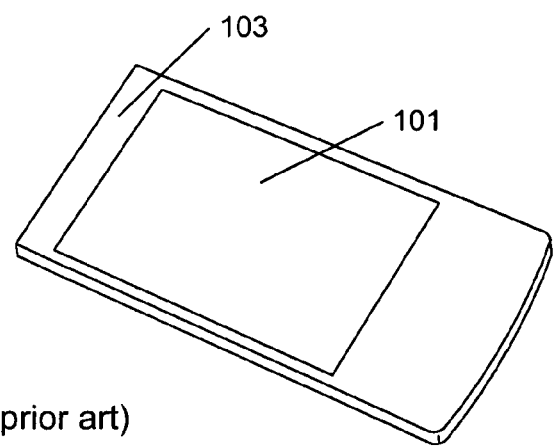
FIGS. 1-3 and 11 are perspective views of known wireless adaptor packages.
Figure 2:
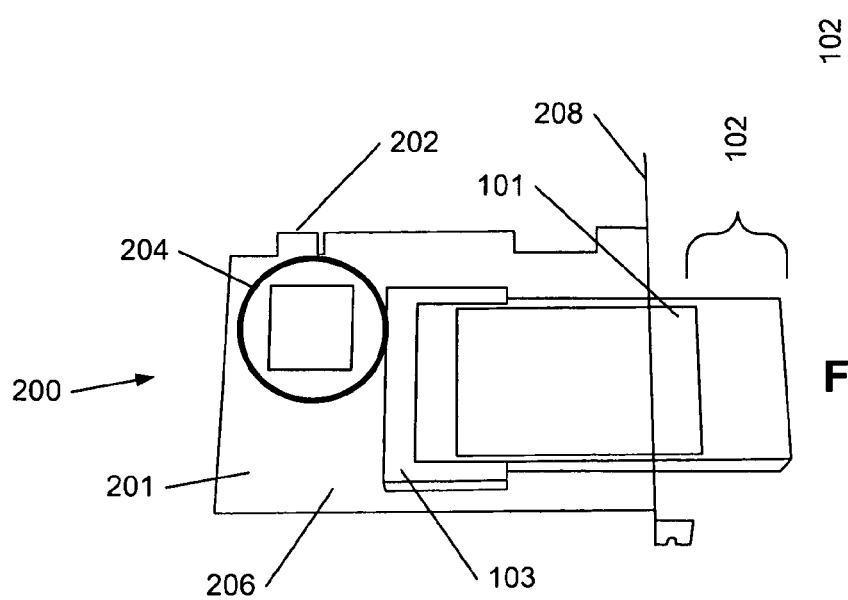
Figure 3:
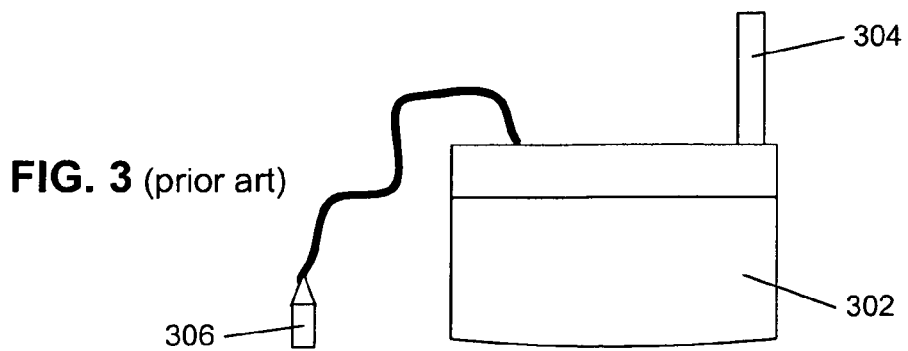
Figure 4:
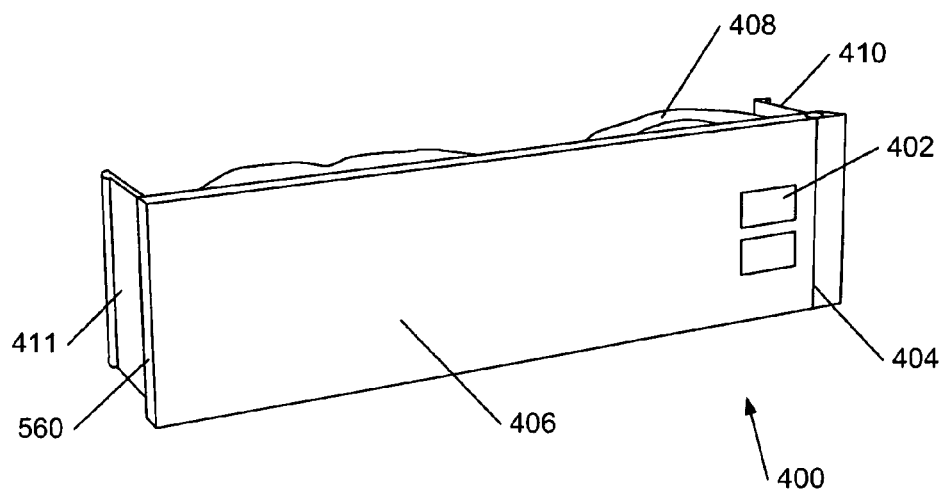
FIG. 4 is a perspective view of a wireless communications enabled faceplate according to an embodiment of the invention.
Figure 5:
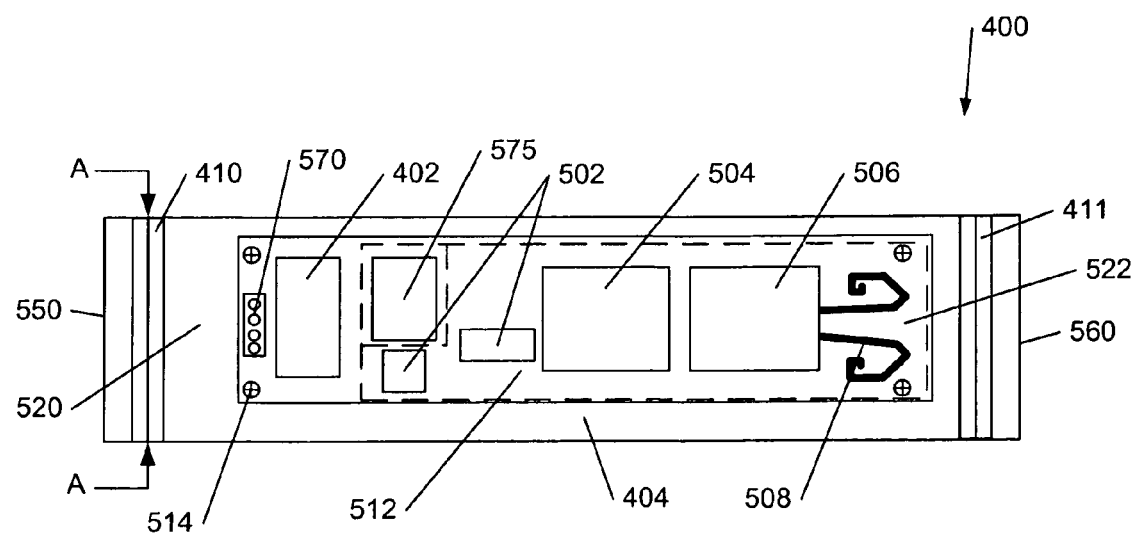
FIG. 5 is a planar view of the interior surface of the faceplate shown in FIG. 4.
Figure 7:
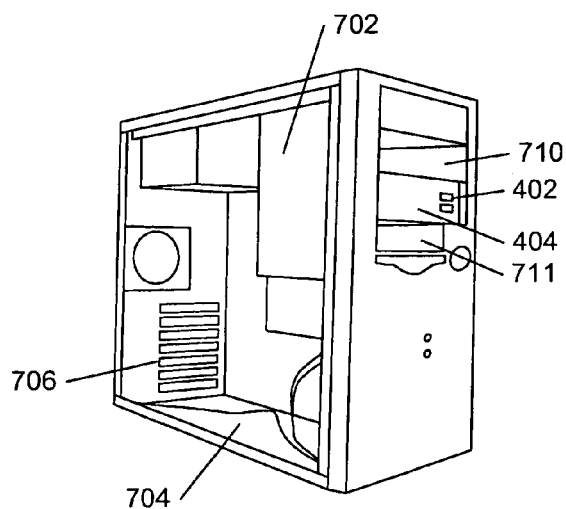
FIG. 7 is a perspective view of a computer case of a host computer incorporating the faceplate of FIG. 4.
Figure 10:
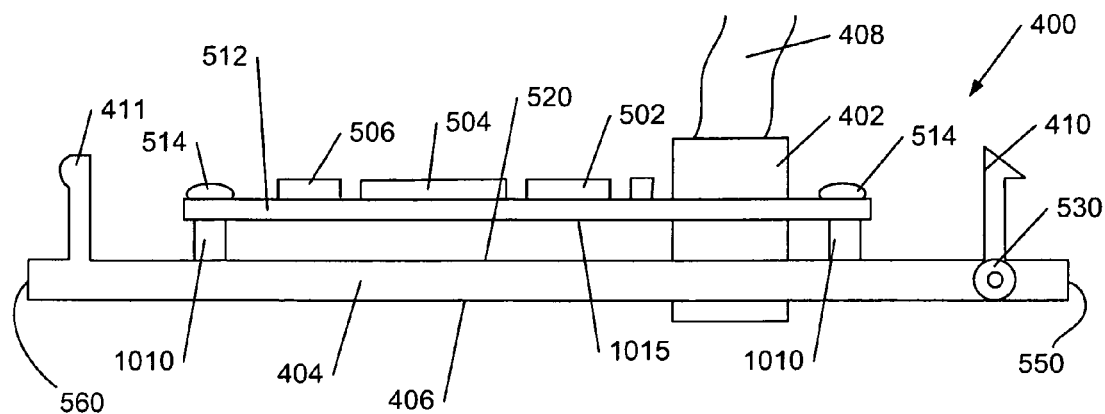
FIG. 10 is a top view of the faceplate shown in FIG. 4.
Figure 11:
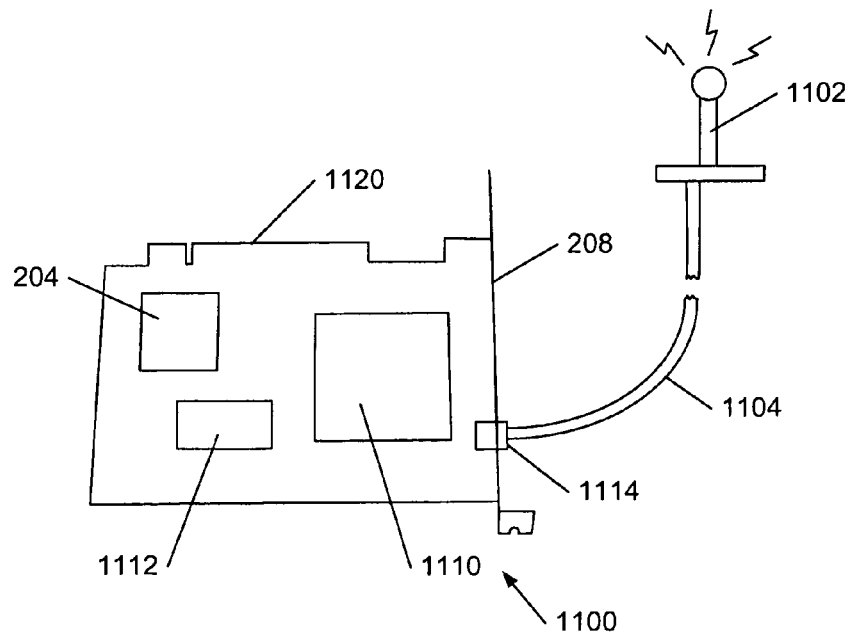

FIGS. 4, 5 and 10 depict different views of a faceplate 400 according to an embodiment of the invention which incorporates a wireless LAN unit 522. This faceplate may be conveniently used to cover an external bay opening in a host computer case, such as the half-height 5¼" drive bay opening 710 shown in FIG. 7. In particular, the interior 520 and exterior 406 major surfaces of the bezel 404 are approximately 1¾" by 5½" to at least substantially or completely cover a standard half-height 5¼" drive bay opening 710, though may vary depending on the particular external bay opening of interest. Alternatively, the bezel 404 surface 520, 406 dimensions can be reduced to e.g. 1" by 4" if the faceplate is to be positioned over a 3½" drive bay opening, such as opening 711 shown in FIG. 7.

Figure 8:
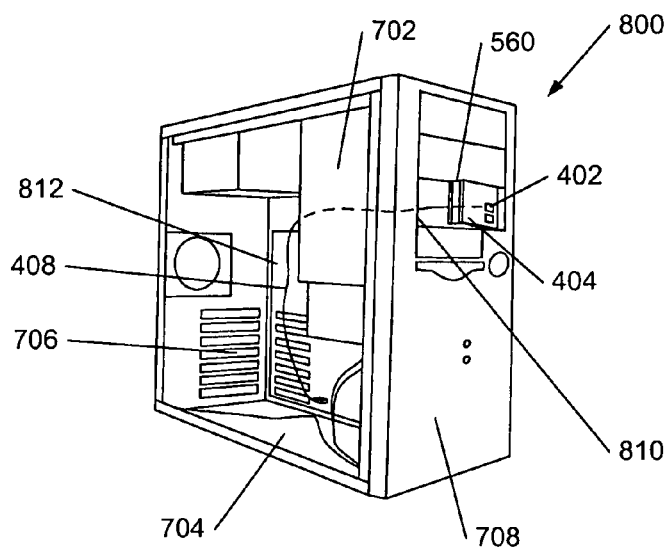
FIG. 8 is a perspective view of a host computer including the case shown in FIG. 7 with one end of the faceplate positioned away from the case.

Guiderails or tines 410, 411, formed of a sturdy flexible material extend from the interior surface 520 of the bezel 404 to contain with the edge of an external bay opening or the computer case to removably secure the faceplate 400 to the case. Note that in this embodiment, as best shown in FIGS. 5 and 10, a hinged member 530 is provided extending from one of the left minor 550 and interior major 520 surfaces of the bezel 404 to permit rotational movement of the wireless LAN unit 522, including antenna 508, about axis A-A when tine 410 communicates with the bay opening edge or case 708 while tine 411 is unsecured. This arrangement permits selective repositioning or reorientation of the antenna 508 to improve reception performance. Although not shown in the figures, the hinged member may, in the alternative or in addition, include a swivel to impart radial movement of the antenna 508 along a major axis of the circuit board 512 upon which the wireless LAN unit 522 is disposed. FIG. 8 depicts the faceplate 400 installed in the computer 800 with the distal edge 560 pivoted away from the computer case 708 through operation of the hinged member 530. Other configurations are possible within the spirit of the invention as long as they permit and/or can impart some degree of movement of at least the antenna 508. Also, though not shown in the figures, in another embodiment, the hinged member 530 and swivel may be omitted if e.g. repositioning of the antenna 508 is undesired.

As shown in FIGS. 5 and 10, a circuit board 512 is attached to the interior major surface 520 of the bezel 404. Here, such attachment is provided by standoffs 1010 (FIG. 10) extending from the interior major surface 520 of the bezel 404 to contact the underside 1015 of the circuit board 512. Screws are shown securing the circuit board to these standoffs 1010, although other types of fasteners or adhesives may be used as is known to those skilled in the art. Though not required, the wireless LAN unit 522 is conveniently disposed on the circuit board in a cost efficient, yet compact manner. The wireless LAN unit includes USB interface circuitry or glue logic 502 serving as a type of data interface enabling data transfer between the wireless LAN unit and the information processor within the computer, typically residing at least in part on the computer motherboard, such as motherboard 812 shown in FIG. 8. USB is a commonplace, high-speed, wired communications link which may be conveniently exploited here since modern motherboards typically have on-board USB support including at least a two-port interface. Moreover, conventional faceplates include USB ports connected to the motherboard two-port interface via a cable extending therebetween. In the embodiment shown in FIGS. 4, 5, 9 and 10, double USB port 402 connector presenting individual USB ports 902 extending through the circuit board 512 and terminating proximate the exterior major surface 406 of the bezel 404 is provided to add such functionality. A cable 408 is routed (see FIG. 8) between the motherboard 812 and a pin connector 570 (see e.g. FIG. 5) to route the USB communications to a USB hub 904 (FIG. 9) provided by IC chip 575 supporting the USB ports 902 along with the USB interface 906 (FIG. 9) provided by the interface circuitry 502. This arrangement enables the wireless LAN unit 522 to communicate with the information processing system without sacrificing one of the individual ports 902 within connector 402. However, in another embodiment, one of the ports 902 can be directly connected to the USB interface 906, bypassing the need for the USB hub 904 at the expense of providing one less live USB connection at the exterior major surface 406 of the bezel 404.

In yet another alternative embodiment, external USB ports 902 need not be provided, so that the need for USB connector 402 and the USB hub 904 can be eliminated.

In the present embodiment, the bezel is shown as being formed of a relatively opaque material such as plastic or aluminum. In other embodiments, different materials may be used to form the bezel 404, including transparent or translucent materials.

Figure 9:
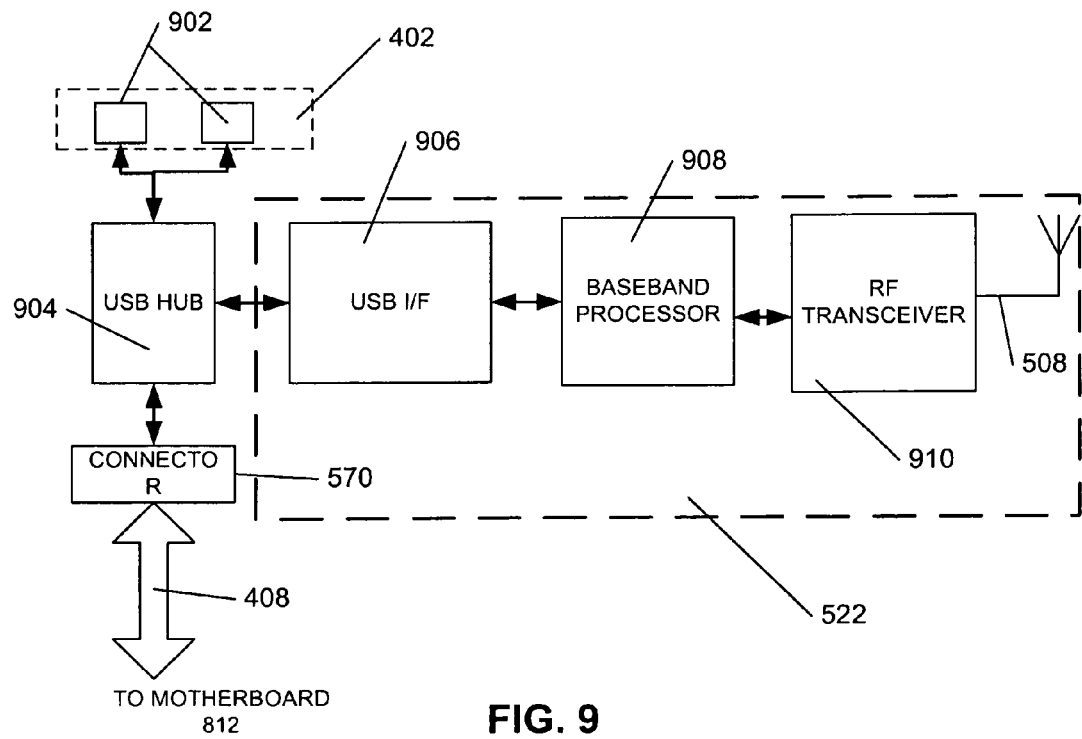
FIG. 9 is a schematic block diagram of the faceplate shown in FIG. 4.

Turning briefly to FIG. 9, FIG. 9 is a schematic block diagram for the faceplate 400 shown in FIGS. 4, 5, and 10. In this diagram, data transfer in the form of electrical signal communications following one of the USB 1.1, USB On-The-Go or USB 2.0 formats between the motherboard 812 of the host computer and the wireless LAN unit 522 are borne across cable 408 electronically coupled to connector 570 and the motherboard 812. The USB hub 904 relays electrical signals asserted at the connector 570 and intended for the wireless LAN unit 522 to the USB interface 906, including outbound MAC+ layer information to be transmitted over a wireless communications link maintained by the wireless LAN adaptor 522, and provides conventional communications support for USB ports 902 housed within the connector 402. Also, the USB hub 904 relays inbound MAC+ layer information received and decoded by the wireless LAN adaptor 522 and intended for the host computer.

The wireless LAN unit 522 includes three major components: the aforementioned USB interface 906 serving as a type of data interface to the host computer, the transceiver electronics including a baseband processor 908 and RF transceiver 910, and radiating antenna such as RF antenna 508, and is arranged in this embodiment as a conventional IEEE 802.11b compliant transceiver with a USB front end. Note, however, that, in accordance with the present invention, the wireless LAN unit 522 can be configured to support a variety of wireless LAN and other information bearing communication standards in addition or in lieu of IEEE 802.11b, such as IEEE 802.11a, IEEE 802.11g, or Bluetooth.

In this embodiment, as shown in FIG. 5, the USB interface 906 is physically provided by circuitry 502, the baseband processor by IC chip 504, and the RF transceiver 910 by the IC chip 506, all respectively disposed on the single-sided circuit board 512, although other standards compliant layouts and arrangements may be interchangeably used. Also, though not required, here the antenna 508 is disposed directly on the circuit board 512 as a cost-savings measure. For example, in an alternative embodiment, a dual-sided circuit board layout may be used in which the data interface and transceiver electronics are disposed on one side, whereas the antenna is disposed on the other. In a further alternative embodiment, components of the wireless LAN unit may be dispersed across plural, electronically interconnected circuit boards to accommodate a number of deployments within or forming part of the host computer case. This may include an arrangement where the data interface and transceiver electronics are disposed on a first circuit board, and the antenna is disposed on a second circuit board electronically coupled to the first circuit board, such as in a stacked configuration.

Figure 6:
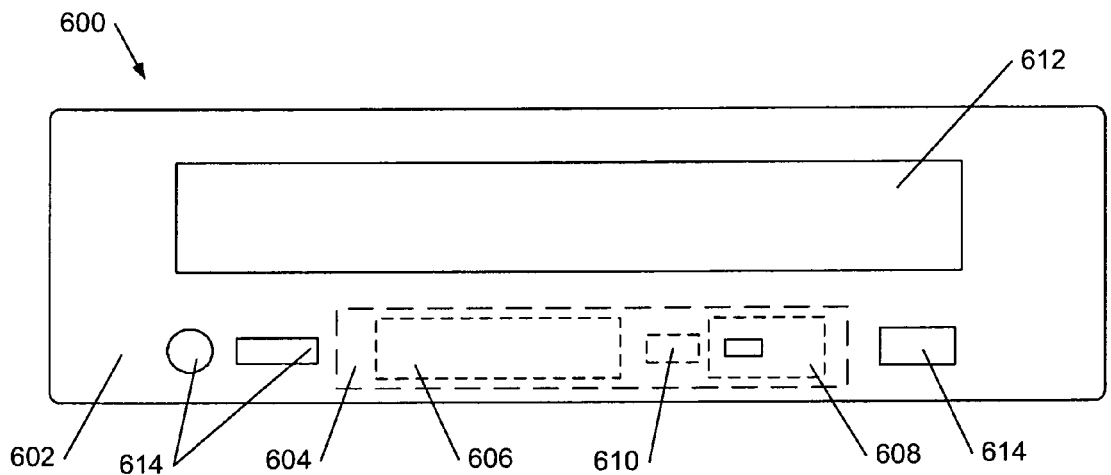
FIG. 6 is a planar view of the exterior surface of a faceplate according to another embodiment of the invention.

FIG. 6 illustrates a faceplate 600 according to an another embodiment of the invention. This faceplate is suitable for covering the opening for an external computer drive bay into which a removable media drive such as a CD-ROM, DVD-ROM, CD-RW etc. has been installed. The cutouts 610 and 614 are provided within the bezel 602 to permit access to drive components such as a headphone jack, volume wheel, drive activity light and media eject button, typically disposed on the face of the drive the faceplate is intended to cover. Likewise, cutout 612 is provided to accommodate an extendable drive media tray forming part of the drive that the faceplate 600 is intended to at least partially cover. As in the case of faceplate 400 previously described, the faceplate 600 includes a wireless LAN unit 606, which but for reduced size to accommodate drive tray slot 612 and cutouts 610 and 614, is similar to wireless LAN unit 502 in both arrangement and function. Connector 608 is shown disposed on the circuit board 604 in common with the wireless LAN unit 606 to accept cabling from a computer motherboard USB port interface.

It should be noted that the assembled circuit board 604 be sized to fit in the cavity between the interior major surface of the bezel 602 and the drive when the faceplate 600 is positioned over the external bay opening. Further, depending on available room and specific drive face layouts, the wireless LAN unit 606 may be located separately from the connector 608 yet remain in electronic communication therewith, such as through appropriate wiring. Furthermore, consistent with the present invention, the individual components making up the wireless LAN unit may be located proximate separate portions of the faceplate 600, using one or more circuit boards, as long as the wireless LAN unit 606 antenna is positioned external to the computer chassis and internal RF shielding. As such, the faceplate 600 can modified to accommodate a wide array of drive types, including various height 5¼" and 3½" form factor slot loading and tray loading removable media drives, as well as fixed media drives and other devices designed for installation in a computer drive bay opening.

As previously discussed, in the embodiment shown in FIG. 6, signal communication between the wireless LAN unit 606 and the host computer may be maintained through coupling to the USB motherboard interface. In an alternative embodiment, signal communication may be implemented through sharing the drive-motherboard interface and cabling used by the drive the faceplate 600 is intended to cover. In such case, the onboard USB interface of the wireless LAN unit 606 is replaced by a drive interface, such as a serial ATA interface and the drive interface located on the drive itself is modified to selectively route signals from the motherboard to the wireless LAN unit 606 connector 608. Traces, cabling or similar apparatus may be used to bring the drive interface and the wireless LAN drive interface into electrical signal communication. Moreover, the host computer program may be notified to communicate with the wireless LAN unit 606 directly or using the drive's interface as a proxy from e.g. a counterpart serial ATA interface for the host computer disposed on e.g. the motherboard or a peripheral daughtercard, such as through a specialized device driver or similar interfacing software executing on or otherwise accessible to the host computer.

It will be obvious to those having skill in the art that many changes may be made to the details of the above-described embodiments of this invention without departing from the underlying principles thereof. For example, the above-described embodiments use USB protocol and instrumentalities to achieve communication between the wireless LAN unit and the information processing system. Consistent with the present invention, other wired communication links can be used to effectuate data transfer, including those based on IEEE 1394 or FireWire protocols or various flavors of the IEEE 802.3 ethernet protocols. The scope of the present invention should, therefore, be determined only by the following claims.

What is claimed is:

1. A faceplate for a housing of a computing device, where the computing device includes a processor, said faceplate comprising:
a bezel that includes interior and exterior surfaces and that removeably covers at least a portion of an external bay opening defined by the housing; and
a wireless local area network (LAN) unit that is mechanically coupled to the interior surface of the bezel and that comprises a data interface,
wherein said data interface enables data transfer between the wireless LAN unit and the processor.

2. The faceplate of claim 1, wherein the data interface comprises at least one of a drive interface, an Ethernet interface, a universal serial bus (USB) interface, and a FireWire interface.

3. The faceplate of claim 1, wherein the external bay opening comprises one of a 3½" drive bay opening and a 5¼" drive bay opening.

4. The faceplate of claim 3, wherein the bezel is substantially rectangular and at least substantially covers the external bay opening.

5. The faceplate of claim 1, wherein the wireless LAN unit further comprises:
a transceiver responsive to the data interface; and
an antenna electronically coupled to the transceiver.

6. The faceplate of claim 5, wherein the wireless LAN unit comprises a first circuit board supporting the data interface and the transceiver.

7. The faceplate of claim 6, wherein the antenna is arranged on the first circuit board.

8. The faceplate of claim 7, wherein
the first circuit board defines first and second surfaces; and
wherein the data interface and the transceiver are arranged on the first surface and the antenna is arranged on the second surface.

9. The faceplate of claim 6, wherein the antenna is arranged on a second circuit board.

10. The faceplate of claim 9, wherein the first and second circuit boards are in a stacked configuration.

11. The faceplate of claim 6, wherein:
the data interface comprises a universal serial bus (USB) interface;
the faceplate further comprises:
a USB connector secured within the bezel and terminating proximate to the exterior surface of the bezel and communicating with the first circuit board; and
a USB hub arranged on the first circuit board,
wherein the USB hub interfaces the USB connector and the USB interface with the processor.

12. The faceplate of claim 1, wherein the bezel is dedicated to the external bay opening.

13. A faceplate for a housing of a computing device, where the computing device includes a processor, said faceplate comprising:
a bezel that includes interior and exterior surfaces and that removeably covers at least a portion of an opening defined by the housing;
a wireless local area network (LAN) unit that is mechanically coupled to the interior surface of the bezel and that comprises a data interface,
wherein said data interface enables data transfer between the wireless LAN unit and the processor;
a connector secured within the bezel and terminating proximate to the exterior surface of the bezel; and
a hub interfacing the connector and the data interface with the processor.

14. The faceplate of claim 13, wherein the data interface comprises at least one of a drive interface, a universal serial bus (USB) interface, an Ethernet interface, and a FireWire interface.

15. The faceplate of claim 13, wherein:
the processor is arranged on a printed circuit board;

the faceplate further comprises a cable extending from the hub to the printed circuit board.

16. The faceplate of claim 13, wherein:
the data interface comprises a universal serial bus (USB) interface;
the hub comprises a USB hub;
the connector comprises a USB connector; and
the USB interface, the USB hub, and the USB connector are compliant with at least one of USB 1.1, USB 2.0, and USB On-The-Go standards.

17. A faceplate for a housing of a computing device, where the computing device includes a processor, said faceplate comprising:
a bezel that includes interior and exterior surfaces and that removeably covers at least a portion of an opening defined by the housing;
a wireless local area network (LAN) unit that is mechanically coupled to the interior surface of the bezel and that comprises a data interface,
wherein said data interface enables data transfer between the wireless LAN unit and the processor; and
a cable terminating proximate to the interior surface of the bezel and electronically coupled to the data interface.

18. A faceplate for a housing of a computing device, where the computing device includes a processor, said faceplate comprising:
a bezel that includes interior and exterior surfaces and that removeably covers at least a portion of an opening defined by the housing;
a wireless local area network (LAN) unit that is coupled to the interior surface of the bezel and that comprises a data interface,
wherein said data interface enables data transfer between the wireless LAN unit and the processor; and
an attachment member that extends from the bezel to releasably communicate with the housing and enable movement of at least one of the antenna and the wireless LAN unit.

19. The faceplate of claim 18, wherein the bezel is formed from an opaque material.

20. The faceplate of claim 18, wherein the bezel is formed from at least one of a translucent material and a transparent material.

21. The faceplate of claim 18, wherein
the processor is arranged on a printed circuit board and communicates with a daughtercard; and
wherein the faceplate further comprises a cable extending from the hub to the daughtercard.

22. A faceplate for a housing of a computing device, where the computing device includes a processor, said faceplate comprising:
a bezel that includes interior and exterior surfaces and that removeably covers at least a portion of an opening defined by the housing; and
a wireless local area network (LAN) unit that is mechanically coupled to the interior surface of the bezel and that comprises a data interface,
wherein said data interface enables data transfer between the wireless LAN unit and the processor, and
wherein the bezel is formed from at least one of a translucent material and a transparent material.

\* \* \* \* \*